(12) United States Patent
Holub

(10) Patent No.: US 11,687,361 B1
(45) Date of Patent: Jun. 27, 2023

(54) GENERATING THREAD SENSORS FOR EXTRACTING SIDE CHANNEL INFORMATION FROM MULTITHREADING PROCESSORS

(71) Applicant: Rapid7, Inc., Boston, MA (US)

(72) Inventor: Viliam Holub, Prague (CZ)

(73) Assignee: Rapid7, Inc., Boston, MA (US)

( * ) Notice: Subject to any disclaimer, the term of this patent is extended or adjusted under 35 U.S.C. 154(b) by 199 days.

(21) Appl. No.: 17/183,162

(22) Filed: Feb. 23, 2021

(51) Int. Cl.
*G06F 9/48* (2006.01)
*G06F 9/50* (2006.01)
*G06F 21/50* (2013.01)
*G06F 21/55* (2013.01)
*G06F 9/455* (2018.01)

(52) U.S. Cl.
CPC ............... *G06F 9/48* (2013.01); *G06F 9/455* (2013.01); *G06F 9/45558* (2013.01); *G06F 9/4806* (2013.01); *G06F 9/4843* (2013.01); *G06F 9/4881* (2013.01); *G06F 9/50* (2013.01); *G06F 9/5027* (2013.01); *G06F 9/5038* (2013.01); *G06F 21/50* (2013.01); *G06F 21/55* (2013.01); *G06F 21/556* (2013.01); *G06F 2009/45587* (2013.01)

(58) Field of Classification Search
CPC ........ G06F 9/48; G06F 9/4806; G06F 9/4843; G06F 9/4881; G06F 9/50; G06F 9/5027; G06F 9/5038; G06F 21/50; G06F 21/55; G06F 21/556; G06F 9/455; G06F 9/45558; G06F 2009/45587
See application file for complete search history.

(56) References Cited

U.S. PATENT DOCUMENTS

| | | |
|---|---|---|
| 9,436,603 B1 | 9/2016 | Pohlack |
| 10,585,669 B2 | 3/2020 | Ogasawara |
| 2014/0317293 A1* | 10/2014 | Shatzkamer ........ H04L 41/5054 709/226 |

(Continued)

OTHER PUBLICATIONS

Atya et al, "Malicious Co-Residency on the Cloud: Attacks and Defense", IEEE Infocom 2017, IEEE, pp. 1-9 (Year: 2017).*

(Continued)

*Primary Examiner* — Charles M Swift
(74) *Attorney, Agent, or Firm* — Ashwin Anand; Lei Sun

(57) ABSTRACT

Systems and methods are disclosed to implement a thread sensor generation system to generate thread sensors for extracting side channel information about other executing threads on a multithreading CPU. In embodiments, the system generates a set of sensors for evaluation. Each sensor may include a sequence of arithmetic or logic operations between variables or constants, which will cause a particular resource usage pattern by the CPU. The sensors are executed on the CPU in parallel with instances of a victim thread to measure an execution slowdown profile of the sensor thread caused by CPU resource conflicts with the victim thread. Based on the execution slowdown profiles, a sensitivity metric is calculated for each sensor, which is used to select the best sensor(s) for the victim thread. Sensors generated using the disclosed techniques can be used to extract secret information via side-channel attacks on currently available multithreaded processors.

19 Claims, 11 Drawing Sheets

(56) References Cited

U.S. PATENT DOCUMENTS

2020/0082259 A1* 3/2020 Gu .................. G06N 3/0454
2020/0372129 A1* 11/2020 Gupta .............. G06F 9/3842

OTHER PUBLICATIONS

Aldaya et al., "Port Contention for Fun and Profit". 2019 IEEE Symposium on Security and Privacy, pp. 870-887 (Year: 2019).*

Liu et al, "pcSVF: An evaluation of Side-Channel Vulnerability of Port Contention", 2020 IEEE 19th International Conference on Trust, Security and Privacy in Computing and Communications (TrustCom), Apr. 2020, pp. 1813-1819 (Year: 2020).*

Bhattacharyya et al., "SMoTherSpectre: Exploiting Speculative Execution through Port Contention", CCS '19, Nov. 11-15, 2019, ACM, pp. 785-800 (Year: 2019).*

Zhang Y, Juels A,et al., "Cross-VM side channels and their use to extract private keys", In Proceedings of the 2012 ACM conference on Computer and communications security, New York, NY, USA. NY, USA: ACM New York; 2012: pp. 305-316.

Inci, M.S., et al., "Seriously, get off my cloud! Cross-VM RSA Key Recovery in a Public Cloud", Cryptology ePrint Archive, Report 2015/898, 2015, pp. 1-15.

Daniel Townley, et al., "SMT-COP: Defeating SideChannel Attacks on Execution Units in SMT Processors", In ACM International Conference on Parallel Architectures and Compilation Techniques, 2019, pp. 1-12.

Z. Wang, et al., "Covert and Side Channels Due to Processor Architecture", In Proceedings of the 22nd Annual Computer Security Applications Conference (ACSAC), Dec. 2006, pp. 1-10.

* cited by examiner

*generated sensor code 210*

```
unsigned long long sensor_code_55() {
    volatile unsigned long long start = rdtsc();        212a
    volatile long a = 68551;
    volatile long b = 93252;                             214
    volatile long c = 82955;
    for (int counter=0; counter < 10000; counter++) {
        a -= a;
        c -= b;
        a += 116;
        c += b;
        c >>= a;
        a <<= a;                                         216
        b >>= c;
        c *= 42;
        b += b;
        b *= c;
        b *= b;
        a += a;
        a -= a;
        b <<= b;
        b += b;
        b >>= a;
        c *= c;
        a -= a;
        c *= c;
        b *= c;
    }
    volatile unsigned long long end = rdtsc();           212b
    total += a ^ b ^ c;
    return end - start;                                  212c
}
```

FIG. 2A

*timestamp retrieval code 220*

```
inline static unsigned long long rdtsc(void)
{
    unsigned hi, lo;
    asm volatile("rdtsc" : "=a"(lo), "=d"(hi));
    unsigned long long t =
            ((unsigned long long)lo) |
            (((unsigned long long)hi)<<32);
    return t;
}
```

*FIG. 2B*

*sensor generator code 230*

```
func generate_instruction()
    var1 = 'a' + random(0 ... $vars)
    opc = random(0 ... 4)
    switch(opc)
        case 0: op = '+='
        case 1: op = '-='
        case 2: op = '>>='
        case 3: op = '<<='
        case 4: op = '*='
    if random(0 ... $use_constant) == 0
        return(format(var1, op, rnd(128)))
    else
        var2 = 'a' + random(0 ... $vars)
        return(format(var1, op, var2))
```

232 — switch block
234 — return(format(var1, op, rnd(128)))
236 — return(format(var1, op, var2))

*FIG. 2C* high-resolution image blocks processed by victim thread 670 sensor sampling pattern A 680 sensor sampling pattern B 682 sensor sampling pattern C 684 low-resolution image units derived based on sensor readings 690

GENERATING THREAD SENSORS FOR EXTRACTING SIDE CHANNEL INFORMATION FROM MULTITHREADING PROCESSORS

BACKGROUND

A superscalar processor includes multiple arithmetic logic units (ALUs), which are relatively inexpensive to implement and allow the processor to execute multiple instructions concurrently. In practice however, the degree of parallelization that can be achieved on these processors is limited. In particular, an instruction may be stalled due to a variety of reasons (e.g. to wait for results from an earlier instruction or fetch data from relatively slow memory), which leads to underutilization of CPU resources. To improve CPU resource utilization, modern multithreading processors allow multiple independent threads to share the resources of the CPU. If one thread is blocked for some reason, the CPU will allow instructions from another thread to use the resources. For example, resource sharing is used extensively in INTEL processors that implement simultaneous multithreading under the commercial name "hyperthreading."

In CPUs that implement resource sharing across concurrent threads, conflicts will occur when two threads require the same resource at the same time. Resource conflicts are resolved by postponing execution of one thread until the resource becomes available. While the conflict resolution does not alter the results of execution, it causes a slowdown in the losing thread to create a measurable side effect, which can be used to derive side channel information about the other thread. However, these side effects tend to be subtle and variable, making them extremely difficult to capture in a reliable and consistent way. Engineered techniques to detect specific side effects require in-depth knowledge about both the underlying hardware and the victim thread. Moreover, current techniques for extracting side channel information from a computer system typically require physical access to the system hardware or special privileges on the system.

SUMMARY OF EMBODIMENTS

The systems and methods described herein may be employed in various combinations and embodiments to implement a thread sensor generation system to generate thread sensors for extracting side channel information about other executing threads on a multithreading CPU. In some embodiments, the thread sensor generation system creates a set of sensors for evaluation. Each sensor in the evaluation set may include a randomly generated sequence of arithmetic or logic operations between variables or constants, which will cause a particular resource usage pattern on the CPU. The sensors are executed on the CPU in parallel with instances of a victim thread to measure an execution slowdown pattern of the sensor thread caused by CPU resource conflicts with the victim thread. Based on the measured execution slowdown patterns, a sensitivity metric is calculated for each sensor with respect to the victim thread. Sensors with the best sensitivity metrics are deployed to extract side channel information about future instances of the victim thread on the CPU. In some embodiments, selected sensors may be used to create a next generation of thread sensors to improve the sensitivity metrics.

BRIEF DESCRIPTION OF THE DRAWINGS

FIG. 2A illustrates a program code of an example thread sensor generated by a thread sensor generation system to extract side channel information about victim threads on a multithreading CPU, according to some embodiments.

FIG. 2B illustrates a program code for retrieving a current timestamp in a thread sensor that extracts side channel information about victim threads on a multithreading CPU, according to some embodiments.

FIG. 2C illustrates a program code to generate thread sensors for extracting side channel information about victim threads on a multithreading CPU, according to some embodiments.

Figure 1:
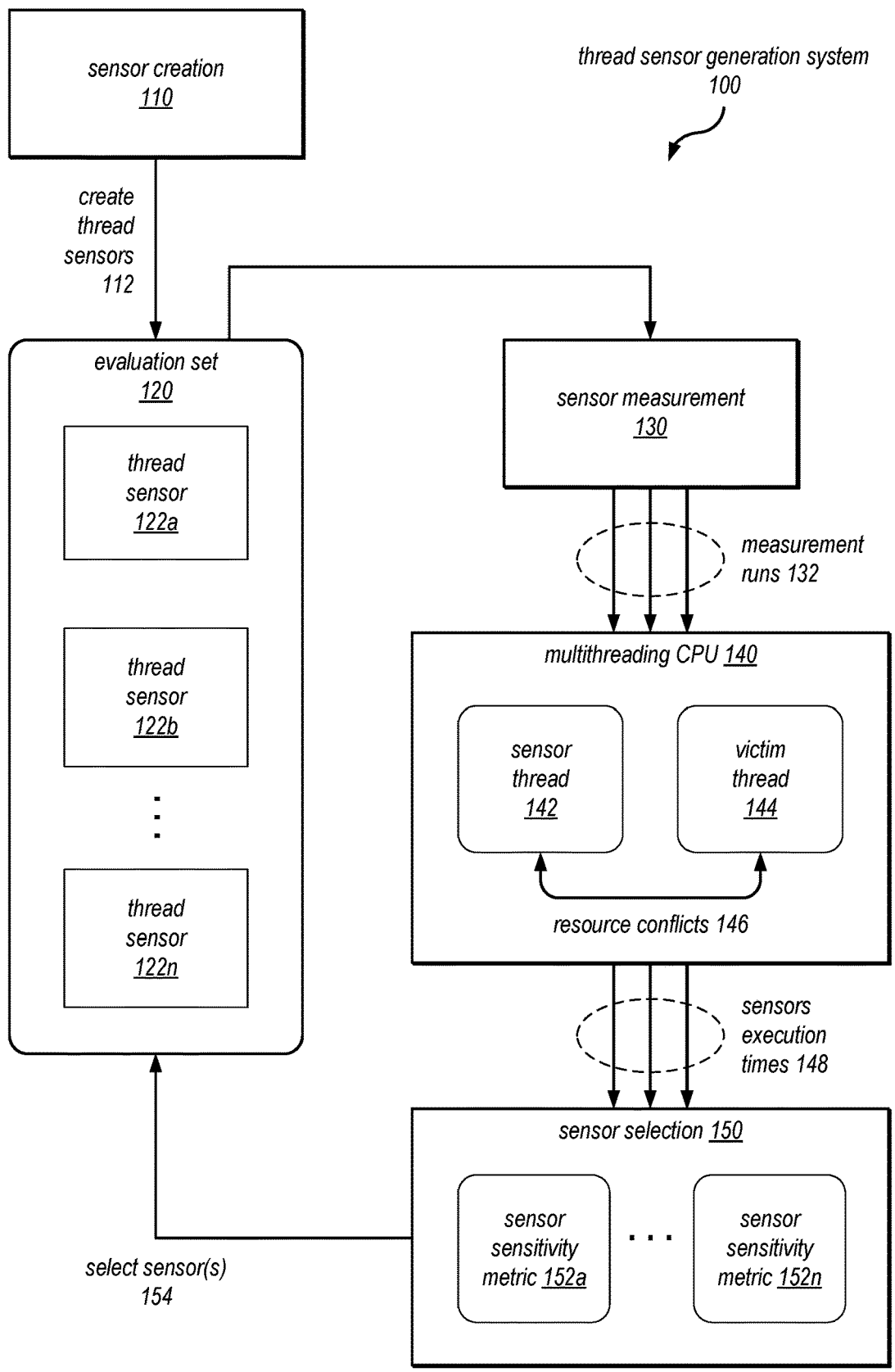
FIG. 1 is a block diagram illustrating a thread sensor generation system that generates and evaluates sensors for extracting side channel information about victim threads on a multithreading CPU, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Multithreading CPUs allow concurrently executing threads to share resources of the CPU, such as arithmetic logic units (ALUs), registers, caches, bus interfaces, and so on. CPU resource sharing underpins many types of multithreading architectures, including simultaneous multithreading, which allows instructions from more than one thread to occur within a single stage of the CPU pipeline. In CPUs that implement resource sharing across concurrent threads, conflicts will arise when two threads require the same resource at the same time. Resource conflicts are typically resolved by postponing execution of one thread until the resource becomes available. While the conflict resolution does not alter the results of the execution, it causes a slowdown in the losing thread to create a measurable side effect, which can be used to extract side channel information about the other thread. However, these side effects are often subtle and variable, making them extremely difficult to capture in a reliable and consistent way. Engineered techniques to detect such side effects require in-depth knowledge about both the underlying hardware and the victim thread. Moreover, current techniques for extracting side channel information from a computer system typically require physical access to the system hardware and/or special privileges on the system.

To improve upon current techniques for extracting side channel information about concurrent threads on a CPU, embodiments of a thread sensor generation system are disclosed herein. In some embodiments, the thread sensor generation system generates thread sensors targeted to a CPU. Each sensor may be generated based on program code that includes a sequence of randomly arithmetic or logic operations between variables or constants, which will cause a distinct resource usage pattern on the CPU. The sensors are executed on the CPU in parallel with instances of a victim thread to measure the execution slowdown of the sensor thread caused by CPU resource conflicts with the victim thread. This process is repeated to search for sensors that are the most sensitive to the victim thread. Sensor(s) selected by the senor generation system may be deployed on the target system to detect and extract side channel information from later instances of the victim thread on the CPU.

During the sensor selection phase, generated sensors are evaluated based on their execution-time patterns. To make accurate time measurements, the sensors may obtain readings from the CPU cycle clock, which in many cases is the most fine-grained clock available on the target system. For example, a sensor generated for an x86 CPU may use the RDTSC instruction provided by the x86 instruction set. For a CORTEX M4 processor, the sensor may read the cycle count register DWT_CYCCNT. In some embodiments, the sensor may use a wall clock reading that can be obtained using a system call. In some embodiments, the sensor will calculate its total execution time based on a starting timestamp and an ending time stamping read from the target system.

In some cases, time measurements taken by the sensor during the selection phase may be noisy due to unpredictable conditions on the target system. Accordingly, in some embodiments, the sensor generation system may clean up the sensor's measurements by filtering out outlier values. In some embodiments, the system may compute an average or minimum of multiple measurements taken by a sensor, and use that value to evaluate the sensor. In some embodiments, the system may perform a statistical analysis of a sensor's measured execution times, for example, by constructing a histogram or distribution of the measurements. The histogram or distribution of the measurements may be used to calculate the sensor's detection ranges for different conditions on the CPU (e.g. different actions performed by the victim thread). In some embodiments, the measurements may be made during actual operation of the CPU, so that the measured values will take into account the noise caused by natural activities of the CPU. In some embodiments, the sensor selection process may be performed over an extended period of time (e.g. days or weeks), so that the sensor selection is made based on a large body of observations of the CPU.

In some embodiments, the sensor generation system will generate program code for each sensor randomly. In some embodiments, the system may permit the user to configure various parameters of the code generation process (e.g., the number operations in the code, the number of constants or variables used, etc.). In some embodiments, the sensor code may be generated based on known information about the victim thread. For example, if it is known that the victim thread heavily uses a particular type of operation or implements a particular sequence of operations, these characteristics may be reproduced in the sensor code to increase the amount of resource conflicts between the sensor thread and the victim thread.

In some embodiments, the sensor generation system may derive new sensors from previously generated sensors. For example, in some embodiments, the sensor generation process may occur over successive iterations, where the best performing sensors of an earlier iteration are used as the basis for generating sensors in the next iteration. In some embodiments, a genetic searching algorithm may be used, where the best performing sensors of one generation are randomly or systematically combined to create the next generation of sensors.

Thread sensors generated by the sensor generation system may be used to extract a variety of side channel information. In some embodiments, a deployed sensor may be executed on the CPU at regular time intervals. In some embodiments, a sensor may be used to detect the presence of a type of victim thread on the CPU. In some embodiments, a sensor may be used to distinguish between different types of victim threads. In some embodiments, a sensor may be used to detect different actions performed by a victim thread, or different types of data processed by the victim thread. For example, in one study, a generated sensor was able to determine the secret encryption key used by a victim thread to carry out the ElGamal encryption algorithm. In another study, a generated sensor was able to successfully extract, from an execution of an image conversion software, a low-resolution copy of the input image. In some embodiments, a collection of multiple sensors can be deployed in combination to extract different types of information about a victim thread on the CPU.

The disclosed method for extracting side channel information provides a number of technical advantages over current methods in the state of the art. First, the disclosed sensor generation process does not require any specialized knowledge of the underlying hardware or the type of victim thread. The generated sensors do not attempt to exploit any specific feature of the underlying hardware (e.g., a special cache or branch eviction mechanism, an undocumented interface, etc.). Rather, the method relies on basic measurements of execution slowdowns of the sensor, which can be easily obtained from any type of multithreading CPU. Unlike some side channel information extraction techniques, the disclosed technique can be carried without elevated privileges on the target system or physical access to the target system. Accordingly, the disclosed process can be carried out by a user with normal user privileges from a remote machine. Finally, the disclosed sensor generation system is adaptable to use different types of sensor searching algorithms and different selection criteria, so that the system can be used to generate custom sensors for a wide variety of victim threads. These and other features and benefits of the disclosed thread sensor generation system are described in further detail below, in connection with the figures.

FIG. 1 is a block diagram illustrating a thread sensor generation system that generates and evaluates sensors for extracting side channel information about victim threads on a multithreading CPU, according to some embodiments.

As shown, the depicted thread sensor generation system 100 implements a sensor creation component 110, a sensor measurement component 130, and a sensor selection component 150. Together, these components implement a process to generate and evaluate thread sensors (e.g. thread sensors 122a-n) to be used to extract side channel information from a multithreading CPU 140. The components 110, 130, and 150 may be implemented as software modules. In some embodiments, the software modules may be executed independently as standalone applications. In some embodiments, the components may be implemented as part of a larger application and managed by another software component such as a job scheduler. In some embodiments, all of the components 110, 130, and 150 may be executed on the target machine that implements the multithreading CPU 140. In other embodiments, one or more of these components may be executed on a remote machine.

As shown, the sensor creation component 110 is responsible for creating 112 an evaluation set 120 of thread sensors. In some embodiments, the sensors 122a-n may be generated in a higher-level programming language such as C, and then compile the source code into executables for the CPU. In other embodiments, the sensors may be generated in assembly or even binary code. In some embodiments, the generated sensor code may include a random sequence of arithmetic or logic operations between variables or constants, so that each sensor 122a-n will cause a distinct resource usage pattern on the CPU 140. In some embodiments, the sensor code will cause the sensor to measure and report its execution time on the CPU. This execution time may be used to measure an execution slowdown of the sensor caused by resource conflicts with a victim thread on the CPU (e.g. victim thread 144). An example of code generated for a sensor 122 is shown in FIG. 2A.

Once generated, the evaluation set of thread sensors 122 is provided to the sensor measurement component 130, which will initiate measurement runs 132 of the sensors on the CPU 140. In some embodiments, a sensor may be executed as a sensor thread 142 on the CPU. The sensor thread 142 may be configured to repeatedly execute the sequence of arithmetic or logic operations of the sensor for a set number of iterations, and then report the execution time taken to complete the execution.

In some embodiments, the sensor measurement component 130 may also be responsible for launching the victim thread 144. Accordingly, each measurement run 132 will involve the concurrent execution of the sensor thread 142 and the victim thread 144 on the CPU 140. In some embodiments, the CPU 140 may include multiple cores, and the sensor measurement component may be configured to force the sensor thread 142 and victim thread 144 to execute on the same core. For example, this may be accomplished on Linux systems using the "taskset" command, which allows the user to set a CPU affinity for a new process. In some embodiments, the victim thread 144 may not be launched by the sensor measurement component 130. For example, the victim thread may be launched by the target system at a known time, and the sensor measurement component will time the measurement runs 132 to coincide with the victim thread.

The multithreading CPU 140 may be any type of CPU that allows concurrently executing threads to share CPU resources. In some embodiments, the CPU 140 may implement a simultaneous multithreading architecture, which is referred to under the commercial name "hyperthreading" in certain INTEL processors. Depending on the type of CPU, the resources that can be shared between different threads may include ALUs, registers, caches, bus interfaces, and the like. The sharing of these resources between the two threads 142 and 144 will occasionally cause conflicts 146 between the sensor thread 142 and the victim thread 144, which will cause the sensor thread to be slowed down in a measurable way. For example, the sensor thread may be forced to stall to wait for the victim thread to finish using a particular resource. Additionally, resource conflict resolution typically involves context switching between the two threads, which causes additional delays. The magnitude of such execution slowdowns tends to be specific to the particular sensor. In some embodiments, the measurements runs 132 may be repeated many times for each sensor to obtain an average or high-confidence range of the measured slowdown values.

As shown, the measured sensor execution times 148 are provided to the sensor selection component 150. In some embodiments, the measured values may be logged to one or more files or databases that can be accessed by the sensor selector 150. In some embodiments, the sensor selector 150 may perform a clean up of the received data, for example, to filter out outliers in the measured execution times. In some embodiments, the sensor selector 150 may cause additional measurement runs 132 to be performed if there is insufficient data for a particular sensor.

In some embodiments, the sensor selector 150 will evaluate the sensors 122 for extracting side channel information about the victim thread 144. In some embodiments, the sensor selector will compute an execution slowdown of the sensor by comparing the measured execution time 148 of the sensor to an execution time of the sensor when the victim thread is not present on the CPU. This execution slowdown may be used to derive a sensor sensitivity metric 152a-n for each sensor. Sensors that experience a larger slowdown in the presence of the victim thread will be assigned a high sensitivity value. In some embodiments, the sensor selector 150 will select 154 the best sensors based on the sensitivity metrics 152, where sensors that are the most sensitive to the victim thread are deemed to be the best sensors.

The sensitivity metric 152 will be determined differently for different types of sensors. For example, if the sensor is to be used to distinguish between two different types of victim threads, the sensitivity metric 152 may be based on the difference in the execution slowdowns caused by the two different victim threads. Sensors having larger difference values will be able to more easily distinguish between the two victim thread types. As another example, if the sensor is used to distinguish between two different actions of a victim thread, the sensitivity metric 152 may reflect the difference between the slowdowns caused by the two actions.

In some embodiments, the sensor selection component 150 may also determine a detection threshold or detection range for the sensor. For example, in some embodiments, the detection threshold may be calculated based on the distribution of measured execution slowdowns produced by the sensor. The detection threshold may be set at a specified quantile of the measured slowdown values obtained during sensor evaluation. In some embodiments, the distribution of measured slowdowns may be captured as a histogram that represents a detection profile of the victim thread. Such a profile can be matched against later observations of the sensor in the field to determine whether the victim thread has been detected.

In some embodiments, the selection of the sensor may be based on sensor metrics other than the sensitive metric 152 for the victim thread. For example, depending on the embodiment, the selection criteria for the best sensor may include factors such as the consistency or precision of the sensor's readings, the sensor's sensitivity to random noise on the CPU, and the sensor's impact on other threads on the CPU, among others.

Once a best sensor is selected 154 by the sensor selector 150, the sensor may be deployed to the target system to observe the CPU for instances of the victim thread or other types of conditions. In some embodiments, the deployed sensor may be launched periodically to obtain a sample of readings from the CPU. The readings can be used to extract a variety of side channel information about victim threads on the CPU. As one example, a sensor selected to detect a particular data processing step in a victim thread may be used to determine the actual data processed by the victim thread (e.g. based on the length of time lapses between detections). In some embodiments, many sensors may be used in combination to extract different types of information from the CPU.

In some embodiments, one or more sensors selected by the sensor selector 150 may be used as the basis to create a next generation of sensors for evaluation. In some embodiments, a top-performing sensor may be modified randomly to generate sensors in a next evaluation set. In some embodiments, multiple top-performing sensors may be combined randomly (e.g. using a genetic algorithm) to generate new sensors. These methods may be used to repeatedly create new generations of sensors that improve upon the previous generation.

FIG. 2A illustrates a program code of an example thread sensor generated by a thread sensor generation system to extract side channel information about victim threads on a multithreading CPU, according to some embodiments. The sensor code 210 shown in this example may be generated by an embodiment of the sensor creator 110 of FIG. 1.

As shown, the code 210 is generated as a C function that returns the function's execution time. The execution time is calculated as the difference between two timestamps taken at lines 212a and 212b, and returned at line 212c. As shown, the timestamps are taken using a rdtsc( ) function, which will be discussed in connection with FIG. 2B. In some embodiments, the sensor thread may execute the function 210 a set number of times (e.g. 100 times) to obtain a sample of measurements from the CPU.

As shown, code section 214 declares a number of variables used in the function 210. These variables are declared using the volatile keyword, which indicates to the compiler that the value may change between accesses in a way that is not predictable by the compiler. The volatile keyword will cause the compiler to refrain from performing certain optimizations to remove or reorder subsequent instructions that use these variables. In some embodiments, the variables are generated randomly, and the number and value range of the variables may be controlled via configuration parameters.

As shown, code section 216 is the body of a for loop, which executes a generated sequence of arithmetic and logic operations using the variables and constants. Again, the generation of this code sequence may be controlled by configuration parameters. In some embodiments, the code generation process may limit the types of instructions that are generated. For example, in some embodiments, operations such as left shift and right shift cannot take a constant as the second operand. In some embodiments, an instruction cannot use the same variable as the two operands. This restriction further avoids certain types of compiler optimizations, for example, to replace an instruction such as "a-=a" with a zero assignment.

FIG. 2B illustrates a program code for retrieving a current timestamp in a thread sensor that extracts side channel information about victim threads on a multithreading CPU, according to some embodiments.

As shown, the timestamp retrieval code 220 implements the function rdtsc( ) which is used in the sensor code 210 of FIG. 2A. In this example, the function is used to obtain the current CPU clock cycle count on an x86 CPU. As shown, the count value is constructed by combining the contents of two registers populated by the instruction.

FIG. 2C illustrates a program code to generate thread sensors for extracting side channel information about victim threads on a multithreading CPU, according to some embodiments. The pseudocode 230 shown here may be implemented by an embodiment sensor creator 110 of FIG. 1 to generate a random instruction in the sequence of instructions 216 shown in FIG. 2A.

As shown in this example, the sensor generator code 230 randomly generates instructions using five different types of operators shown in the switch statement 232. Line 234 returns a generated instruction that uses a constant as the second operand, while line 236 returns a generated instruction that involves two different variables. As will be appreciated by those skilled in the art, the code shown in FIGS. 2A to 2C are provided as illustrations. Other embodiments of the invention described herein may use different code to implement the disclosed functionalities.

Figure 3:
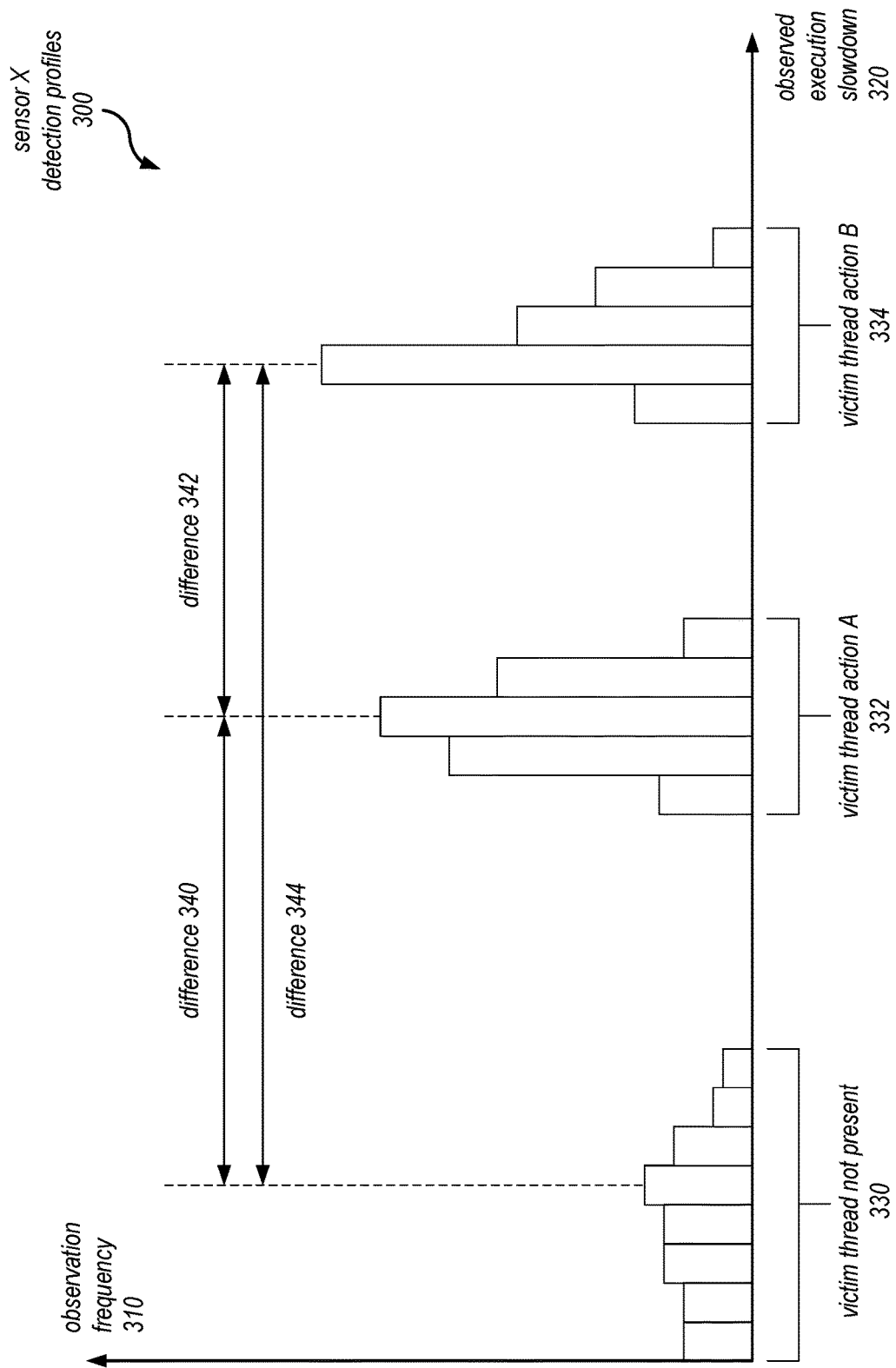
FIG. 3 illustrates example detection profiles for a type of victim thread measured for an example thread sensor, according to some embodiments.

FIG. 3 illustrates example detection profiles for a type of victim thread measured for an example thread sensor, according to some embodiments.

As shown, the figure depicts a graph that indicates a set of detection profiles 300 for different conditions to be detected by a particular thread sensor X. In this example, sensor X is used to detect three different conditions on the CPU that correspond to three different detection profiles. Detection profile 330 indicates that a victim thread is not present on the CPU. Detection profile 332 indicates that the victim thread has performed action A during the sensor's execution. Detection profile 334 indicates that the victim thread has performed action B during the sensor's execution. Each sensor profile is represented as a histogram or distribution in the graph, where each histogram bar represents an observation frequency 310 of a particular observed value of execution slowdown 320. These profiles may be built during the evaluation phase of the sensors, based on many runs of sensor X on the CPU. During actual use, sensor X will be run to collect a sample of readings from the CPU, and the sample will be compared to each detection profile 330, 332, and 334 to see whether there is a match. A detection is positive if the sample sufficiently matches one of the profiles.

As shown in this example, each pair of detection profiles are separated by a respective distance or difference 340, 342, and 344. These differences may be measured between the mean or median values of two detection profiles. In some embodiments, these differences 340, 342, and 344 are used to determine the sensitivity metrics 152 of the sensor. Sensors that exhibit large execution time differences between detected ranges are generally preferred by the sensor selector 150.

Figure 4:
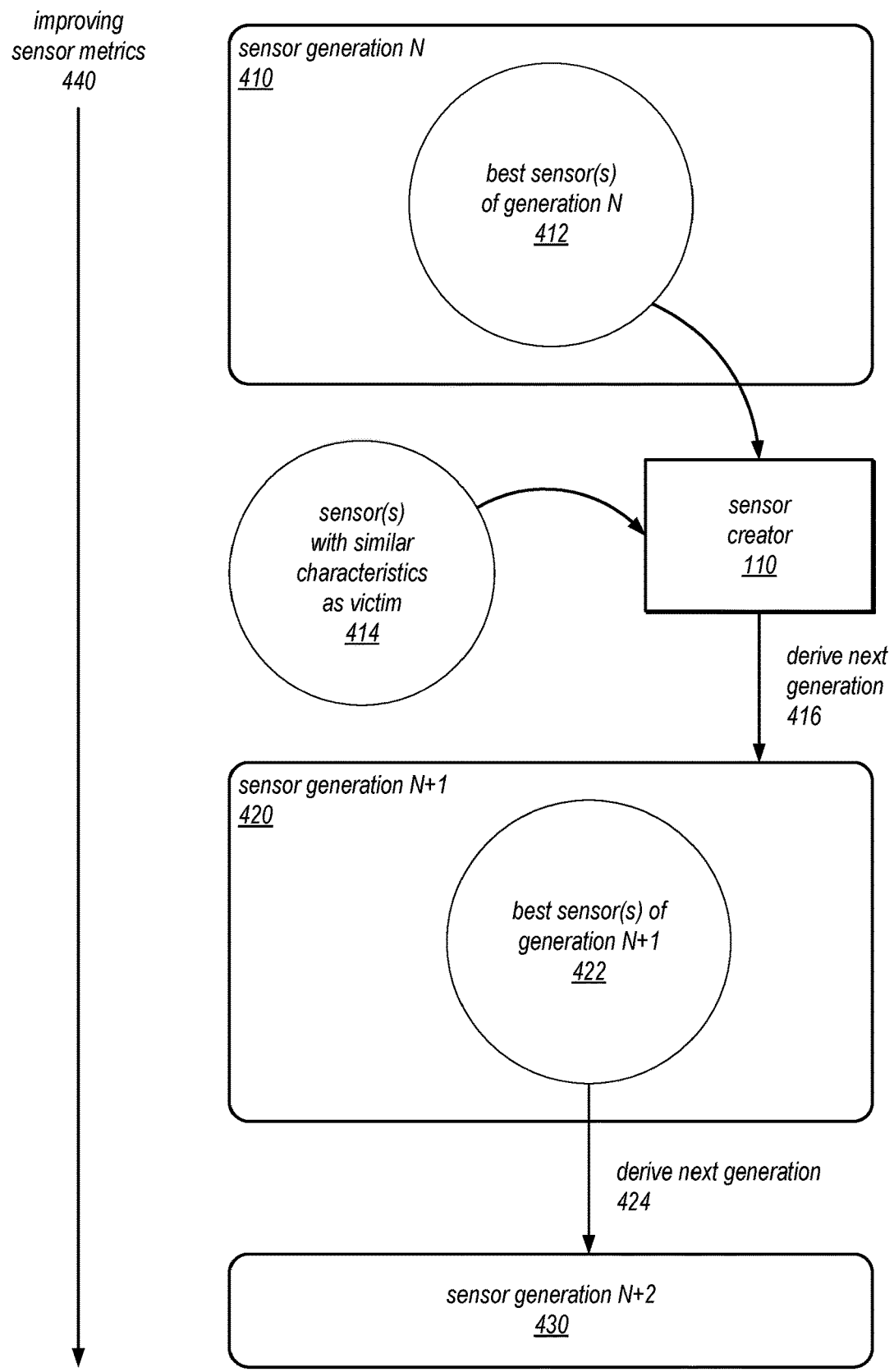
FIG. 4 illustrates an example process used by a thread sensor generation system to generate successive generations of thread sensors with improving sensor metrics, according to some embodiments.

FIG. 4 illustrates an example process used by a thread sensor generation system to generate successive generations of thread sensors with improving sensor metrics, according to some embodiments. The depicted process may be performed by an embodiment of the thread sensor generation system 100 of FIG. 1.

As shown, in some embodiments, the thread sensors may be generated in successive generations, for example, generations N 410, N+1 420, N+2 430, and so on. Each new generation of sensors will be created based on the best sensors of the previous generation. In this example, the best sensors 412 of generation N is used by the sensor creator 110 to derive 416 the next generation of sensors N+1. Similarly, the best sensors 422 of generation N+1 is used to derive 424 the next generation of sensors N+2.

In some embodiments, to create a next generation of sensors, the sensor creator 110 will make random modifications to the best sensors of the previous generation. For example, the sensor creator may randomly modify the sequence of arithmetic of logic operations used by a best sensor of the previous generation. In some embodiments, a genetic search algorithm may be used, where the instruction sequences of two or more best-performing sensors are randomly combined to create the next set of sensors. This process can be repeated to generate successive generations of sensors with improving 440 sensor metrics. In some embodiments, the process is halted when the sensor metrics cease to improve. In some embodiments, the process may be used to generate a tree of sensor groups, where improving branches are followed and non-improving branches are abandoned.

In some embodiments, the sensor creator 110 may also use sensors 414 with similar characteristics as the victim thread to derive new sensors. For example, it may be known that the victim thread implements a specific algorithm or sequence of instructions. A second thread that implements a similar algorithm or sequence of instructions is likely to cause significant resource conflicts with the victim thread on the CPU. Accordingly, in some embodiments, the sensor generator 110 is configured to include similar variations of the characteristics of the victim thread in the generated sensors. For example, sensors with variants of victim thread characteristics may be added to the pool of sensors to be used to derive the next generation of sensors. In some embodiments, desirable victim threads characteristics may be injected into the sensors in an automated and/or randomized manner.

Figure 5A:
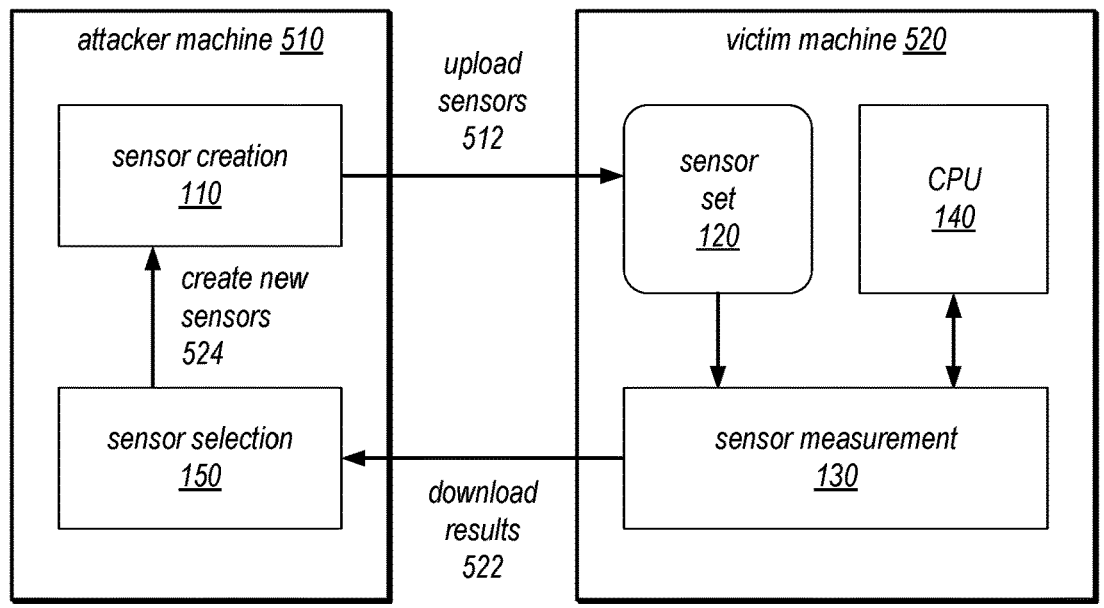
FIGS. 5A and 5B illustrate different types of computer systems that can be used to implement a thread sensor generation system, according to some embodiments.
Figure 5B:
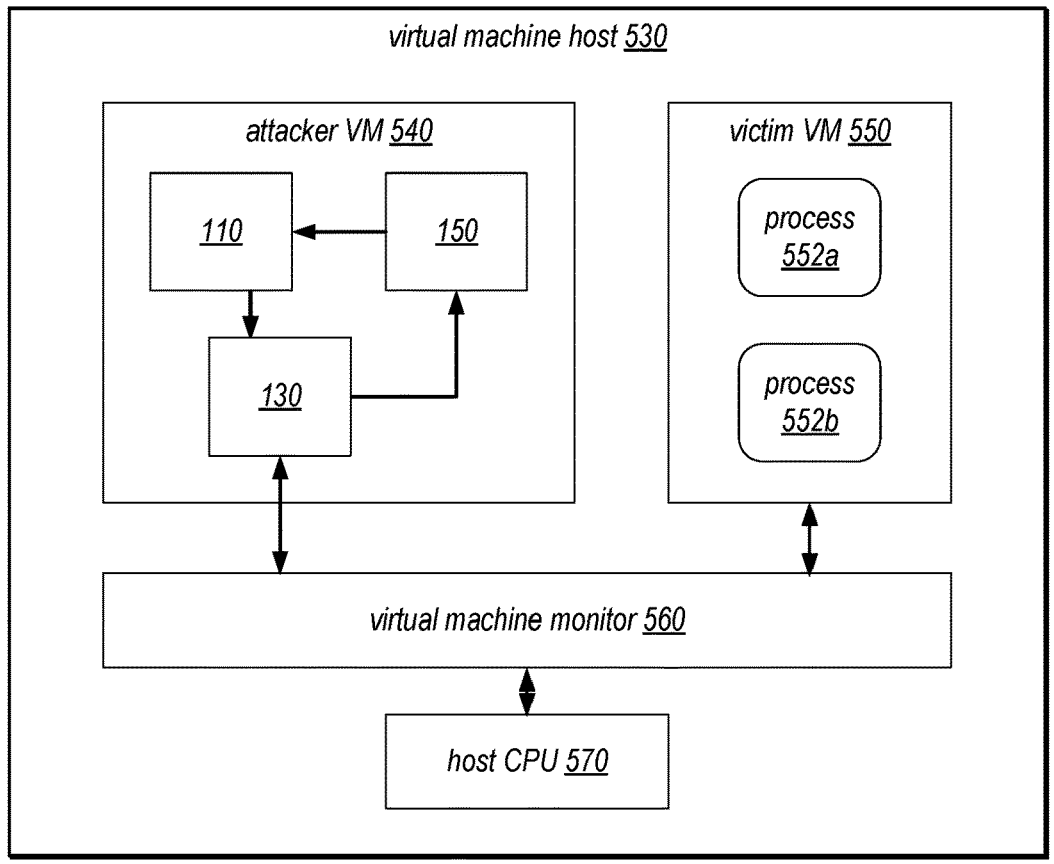

FIGS. 5A and 5B illustrate different types of computer systems that can be used to implement a thread sensor generation system, according to some embodiments.

FIG. 5A illustrates a remote attack performed by an attacker machine 510 on a victim machine 520. In some embodiments, the attacker machine 510 may access with the victim machine 520 over one or more networks, including a public network such as the Internet. As shown, the attacker machine 510 is configured to orchestrate the sensor generation process by implementing the sensor creation component 110 and sensor selection component 150 locally. Sensor sets 120 generated by the sensor creator are periodically uploaded 512 to the victim machine. Once uploaded, a sensor measurement component 130 installed on the victim machine will perform measurement runs of the sensors on the target CPU 140. The results of the sensor measurement runs are downloaded 522 to the attacker machine, and analyzed by the sensor selection component 150 on the attacker machine to create 524 new sensors. In some embodiments, the process may be repeated to create and evaluate multiple generations of sensors, in a process discussed in connection with FIG. 4.

In some embodiments, the sensor measurement component 130 may be a piece of client software that was previously pushed to the victim machine. Such client software may be configured to work with the attacker machine, for example, to periodically obtain sensor sets, report sensor measurements, receive configuration instructions or software updates, etc. In some embodiments, the sensor measurement component 130 may simply include normal software on the victim machine that can be used by the attacker machine to remotely execute the sensors. For example, if the attacker machine has remote login permissions on the victim machine, the sensor measurement process may be performed via a script on the server side. As another example, the sensors may be implemented as client-side code (e.g. Javascript) that is downloaded and automatically executed by the victim machine (e.g. via a web browser). Such client-side code may be able to launch processes on the victim machine and report back the execution time experienced by the processes.

In some embodiments, the attacker machine 510 may also be configured to deploy sensors to the victim machine. In some embodiments, the attacker machine may be used to evaluate and deploy a large number of sensors to the victim machine in stages. For example, the attacker machine may first select and deploy a first group of sensors to detect a particular type of victim thread on the victim machine. Based on the data gathered by the first group of sensors, the attacker machine may then select and deploy a second group of sensors to detect specific actions performed by observed instances of the victim thread. Based on data gathered by the second group of sensors, the attacker machine may deploy additional groups of sensors to extract more detailed information about the execution of the victim threads.

FIG. 5B illustrates an attack performed by an attacker virtual machine 540 that is hosted on the same virtual machine host 530 as a victim virtual machine 550. As shown in this example, the attacker VM 540 implements components 130, 140, and 150, in a similar manner as discussed in connection with FIG. 1. The sensors generated by the attacker VM 540 are run, through a virtual machine monitor 560, as sensor threads on the host CPU 570. Similarly, the victim VM 550 also executes a number of processes 552, which are executed as victim threads via the virtual machine monitor 560. Under controlled circumstances, sensor threads may be made to run on the same CPU core as the victim threads, and at the same time. When this occurs, any execution slowdown of the sensor threads caused by resource conflicts with the victim thread will be captured by the sensor threads and reported back to the attacker VM. Given a sufficiently large sample of sensor readings, this technique can be used to extract side channel information about the victim VM processes despite noise generated by the virtual machine host. Advantageously, the described technique may be used on any type of virtualization platform without relying on any specific hardware features of the platform (e.g. a particular cache eviction mechanism).

Figure 6A:
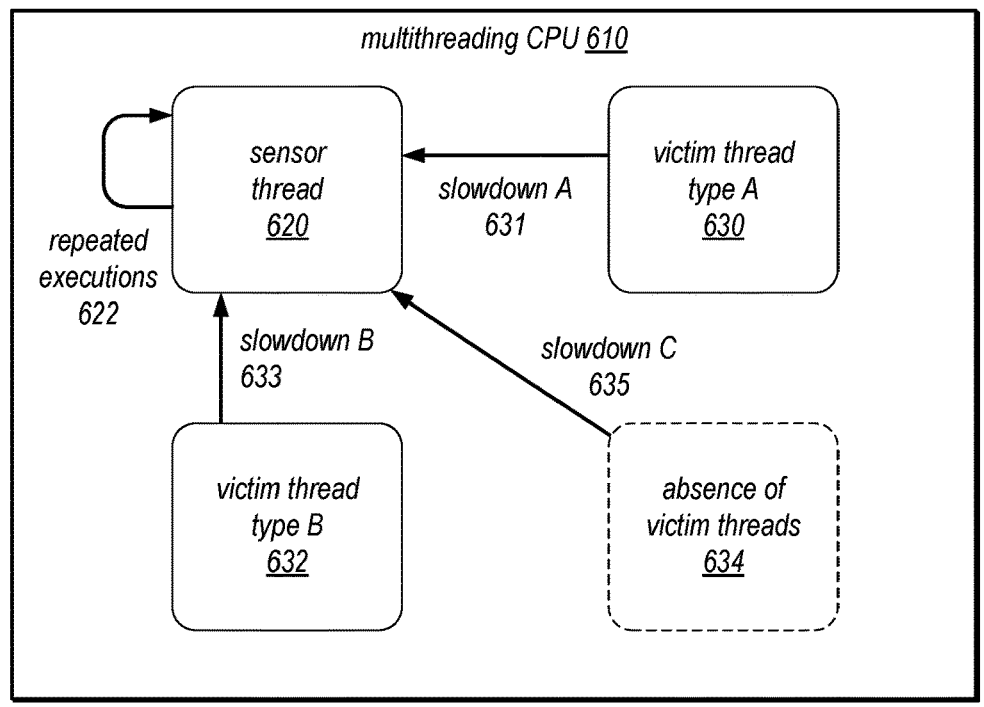
FIGS. 6A, 6B, and 6C illustrate example types of information that can be extracted using a thread sensor generated to target victim threads on a multithreading CPU, according to some embodiments.
Figure 6B:
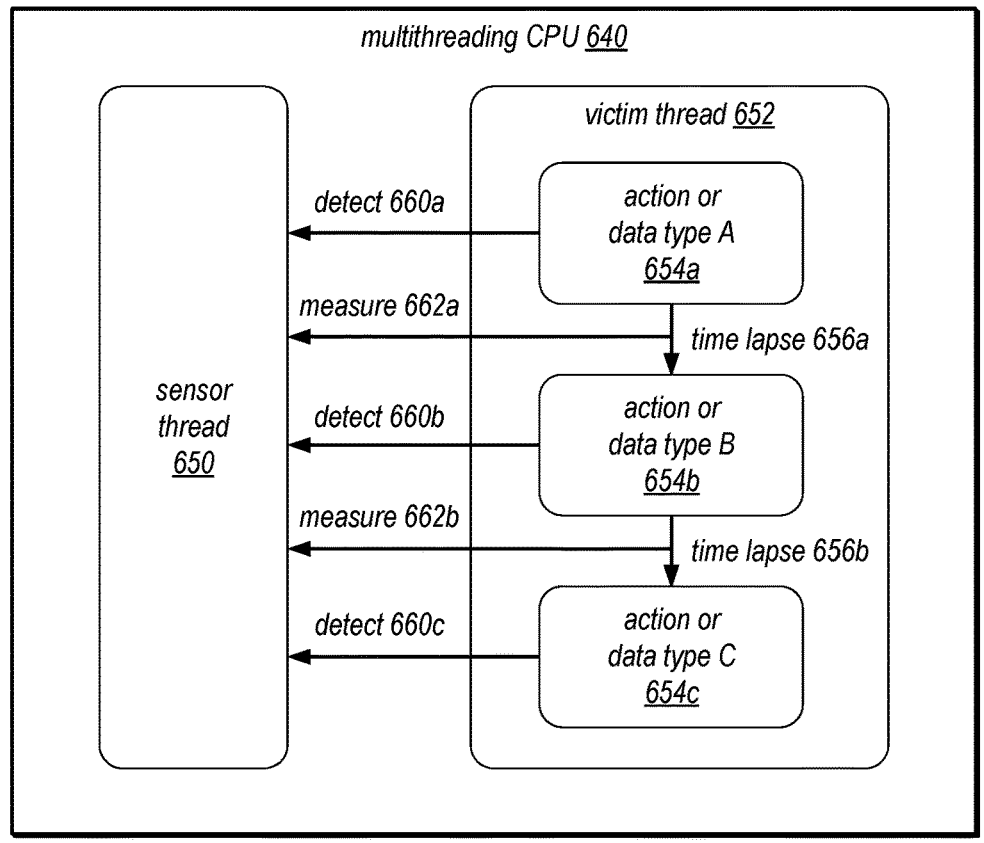
Figure 6C:
Figure 6C:
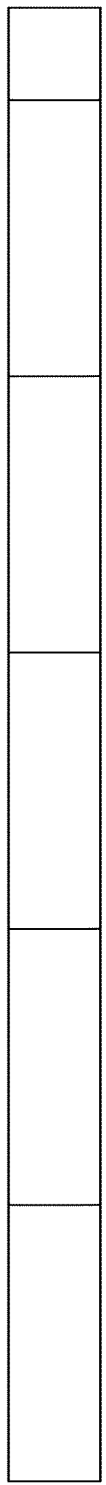
Figure 6C:
Figure 6C:
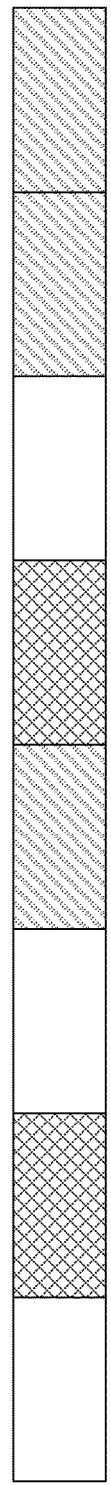

FIGS. 6A, 6B, and 6C illustrate example types of information that can be extracted using a thread sensor generated to target victim threads on a multithreading CPU, according to some embodiments.

FIG. 6A illustrates the use of a thread sensor 620 generated for a multithreading CPU 610 using the disclosed techniques. In this example, the sensor thread 620 is selected to distinguish between different types of victim threads, such as victim thread type A 630 and victim thread type B 632. As shown, victim thread type A will cause a particular slowdown A 631 of the sensor thread, which may be determined during the sensor evaluation process, and victim thread type B will cause a different slowdown B 633 of the sensor thread. As discussed, sensor thread 620 may be selected based on the difference of the two slowdown values, so that it can be used to easily distinguish between the two types of victim thread. Additionally, the sensor thread in this case also reports a slowdown C 635 when neither victim thread types A or B are on the CPU. In some embodiments, sensor thread 620 may be run periodically in repeated executions 622 on the CPU to watch for victim threads types A and B.

FIG. 6B illustrates another use of a thread sensor 650 generated for a multithreading CPU 640 using the disclosed techniques. In this example, the sensor thread 650 is used to detect different actions (e.g. actions 654*a-c*) performed by a victim thread 652 or different data types (e.g. data types 654*a-c*) processed by the victim thread 652. In some embodiments, the detected pattern of these actions or data types can be used to extract additional side channel information from the victim thread 652. As shown in this example, the sensor thread detects 650 is able to use the detections 660*a-c* to measure 662 the two time lapses 656*a* and 656*b* between the actions/data types. In some cases, these time lapses 656 may reveal important information, such as the contents of the data being processed by the victim thread.

In one study, a victim thread was created to internally generate a character string (e.g. "Hello world") that is not communicated to any external processes or threads. The victim thread was coded so that it performs a sequence of instructions for each generated character, which can be detected by a sensor thread that performs the same sequence of instructions. For each character, the victim thread waits for a deterministic amount of time depending on the value of the character. In the study, the sensor thread was able to determine the precise character string generated by the victim thread based on the wait times, without any other form of inter-thread communication from the victim thread.

In another study, a specially selected sensor thread was able to extract the secret encryption key that was used by an encryption program that implemented the ElGamal encryption algorithm. ElGamal is used in certain GNUPG or OPENPGP encryption and signing tools. The pseudocode for the ElGamal encryption scheme is provided below in Table A.

Table A: ElGamal Encryption Scheme

1: for i=n down to 1 do
2: Square
3: ModReduce
4: if e[i]==1
5: Mult
6: ModReduce The ElGamal encryption scheme computes the function $x^e$ mod N where x is the secret to be encrypted, e is a secret encryption key of n bits, and N is a constant. A typical implementation of this function runs a cycle for each bit of the encryption key based on the pseudocode above. As shown, for every bit of the encryption key the scheme performs the Square and ModReduce operations. However, the Mult and ModReduce operations at lines 5 and 6 are only performed if a bit of the encryption key is 1. To extract the encryption key, a sensor is first selected to detect the Mult operation, using the techniques discussed previously. Using the selected sensor, the elapsed time between Mult operations can be measured. These elapse times, which can be used to distinguish between 0 bits and 1 bits in the encryption key, are then used to determine the full encryption key. Table B below shows the assembly code for the sensor used to detect the Mult operation, which was generated using the disclosed sensor generation process. During the study, the sensor produced an 18% slowdown when Mult was executed concurrently on the target CPU.

Table B: Generated Sensor for Mult Operation movl % r11d, % ecx
movq % r10, % rax
subq % r10, % rsi
subq % r9, % rdi
salq % cl, % rax
movq % r9, % rdx
movq % r11, % r10
sarq % cl, % rax
subq % r11, % rdx
movl % esi, % ecx
subq % rdi, % rsi
subq % rax, % r10
salq % cl, % rdx
imulq % rdi, % rsi
movl % edx, % ecx
imulq % r10, % rdx
sarq % cl, % rdi
movl % eax, % ecx
sarq % cl, % rsi
movl % edi, % ecx
salq % cl, % rax
addq % r10, % rsi
movq % rax, % rcx
addq % rsi, % rdi
salq % cl, % rdx
salq % cl, % rcx FIG. 6C illustrates yet another use of a thread sensor generated using the disclosed techniques. In this embodiment, a generated sensor is used to observe a victim thread that processes an image. In a study, the victim thread was an image converter that converted an image from BMP format to the JPEG format. During the conversion, high-resolution blocks of the image 670, shown in the top row in the figure, are processed in a particular sequential order. However, the processing of each individual block is too fine-grained to be detected by the sensor thread. To solve this problem, the sensor thread is run at different sampling patterns 680, 682, and 684 against the image conversion thread. Each reading returned by a sensor thread represents a number of contiguous blocks in the image. The readings are then aligned based on time and averaged over larger units 690 of the image, so as to reproduce the image in a lower resolution. In the study, the above-described process was able to extract a recognizable low-resolution version of an image processed by the image converter based on leaked side-channel information extracted by the thread sensor. The process was able to identify areas of sharp contrast in the original image (e.g. the sharp edges), which are processed differently than areas of low contrast by the JPEG encoder.

Figure 7:
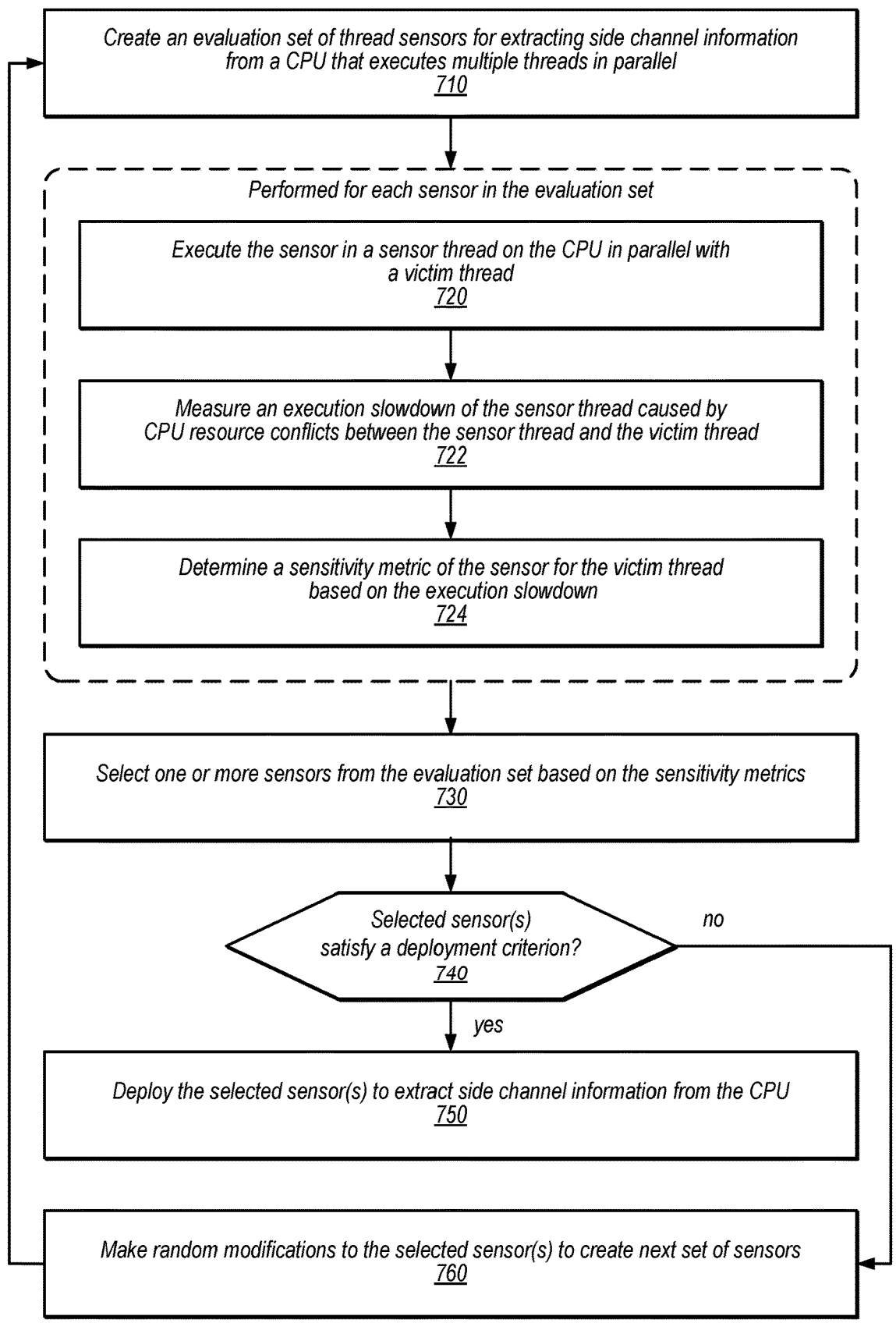
FIG. 7 is a flowchart illustrating a process performed by a thread sensor generation system to generate and evaluates sensors for extracting side channel information about victim threads on a multithreading CPU, according to some embodiments.

FIG. 7 is a flowchart illustrating a process performed by a thread sensor generation system to generate and evaluate sensors for extracting side channel information about victim threads on a multithreading CPU, according to some embodiments. The depicted process may be performed by an embodiment of the thread sensor generation system 100 of FIG. 1.

The process begins at operation 710, where an evaluation set of thread sensors (e.g. thread sensors 122a-n) is created. The thread sensors may be created by the sensor creator 110 of FIG. 1. In some embodiments, a thread sensor may be generated to include a random sequence of instructions (e.g. as shown in FIG. 2A) to cause a particular resource usage pattern on the CPU. Each sensor may also measure its own execution time on the CPU, for example, by using the CPU clock cycle count (e.g. as shown in FIG. 2B). In some embodiments, the sensors may be generated using a similar process as shown by the sensor generator pseudocode of FIG. 2C. The sensors will be evaluated for their abilities to extract side channel information about a victim thread from a multithreading CPU (e.g. multithreading CPU 140) that is configured to execute multiple threads in parallel. In some embodiments, the CPU may implement a simultaneous multithreading or "hyperthreading" architecture.

As shown, operations 720, 722, and 724 are performed for each sensor in the evaluation set. At operation 720, the sensor is executed in a sensor thread on the CPU in parallel with the victim thread. Operation 720 may be performed by an embodiment of the sensor measurement component 130 of FIG. 1. In some embodiments, the victim thread may be started by the sensor measurement component. In some embodiments, the sensor measurement component may time the launching of the sensor threads to occur with the victim thread. The sensor measurement component may perform many measurement runs for each sensor. Each measurement run may take many readings of the sensor's execution time for its random sequence of instructions.

At operation 722, an execution slowdown of the sensor thread is measured. As discussed, the execution times of the sensors will be slowed down by the presence of the victim thread to varying degrees depending on the amount of resources conflicts between the sensor thread and the victim thread. In some embodiments, the slowdown may be determined by comparing the execution times of the sensor thread with and without the victim thread. In some embodiments, multiple slowdown values may be obtained for the sensor thread for different conditions on the CPU (e.g. different types of victim threads, different actions of the victim thread, etc.). In some embodiments, the multiple measurements obtained for each sensor may be filtered to remove outlier values, and then averaged. In some embodiments, the measured execution slowdown values for a sensor may be used to determine a detection profile, range, or threshold of the sensor, as discussed in connection with FIG. 3.

At operation 724, a sensitivity metric for the victim thread (e.g. sensitivity metric 152) is determined for the sensor based on the measured execution slowdowns. The sensitivity metrics may be determined by an embodiment of the sensor selector 150 of FIG. 1. In some embodiments, the sensitivity metric may be calculated based on the difference between the sensor's execution times under two or more CPU conditions. The larger the difference, the better the sensor is at distinguishing between the different CPU conditions. For example, the sensitivity metric may indicate the sensor's ability to detect the presence of a particular type of victim thread, or distinguish between different types of data process by the victim thread, etc. In some embodiments, each sensor may be evaluated based on multiple sensitivity metrics calculated for the sensor.

At operation 730, when sensitivity metrics has been determined for all sensors in the evaluation set, one or more sensors are selected from the set based on the sensitivity metrics. In some embodiments, sensors that are the most sensitive to a particular CPU condition will be selected. In some embodiments, the selection may be made based on multiple factors including the sensitivity metrics. In some embodiments, a group of several sensors will be selected to target different CPU conditions. Such a group of sensors may be used together to monitor for multiple conditions of interest on the CPU.

At operation 740, a determination is made whether the selected sensor(s) satisfy a deployment criterion. Example deployment criteria may include considerations such as the sensitivity metric of the sensor, the sensitivity of the sensor to random noise, the significance of the sensor's impact on other threads on the CPU, etc. If the sensor(s) do satisfy the deployment criterion, they are deployed to the target system at operation 750 to extract side channel information from the CPU. In some embodiments, a deployment may involve uploading the sensors to the target machine over a network. As discussed in connection with FIGS. 5A and 5B, the sensors may be configured to run periodically on the CPU to listen for instances of the victim thread.

If the sensor(s) do not satisfy the deployment criterion, in some embodiments, they may be used to create a next set of sensors for evaluation in a process as discussed in connection with FIG. 4. In some embodiments, the sensor creator may make random modifications to the instruction sequence of the selected sensors to generate the next set of sensors. In some embodiments, the new evaluation set may be created by randomly combining the best sensors of the previous generation, or by injecting known instructions of the victim threads into the new sensors. The process may be repeated in this manner to generate successive set of sensors with improving performance metrics. The process may be stopped when the performance metrics satisfy the deployment criterion or converge to a stable level. In some embodiments, this process may be fully automated so that it can run to completion with no human intervention.

Figure 8:
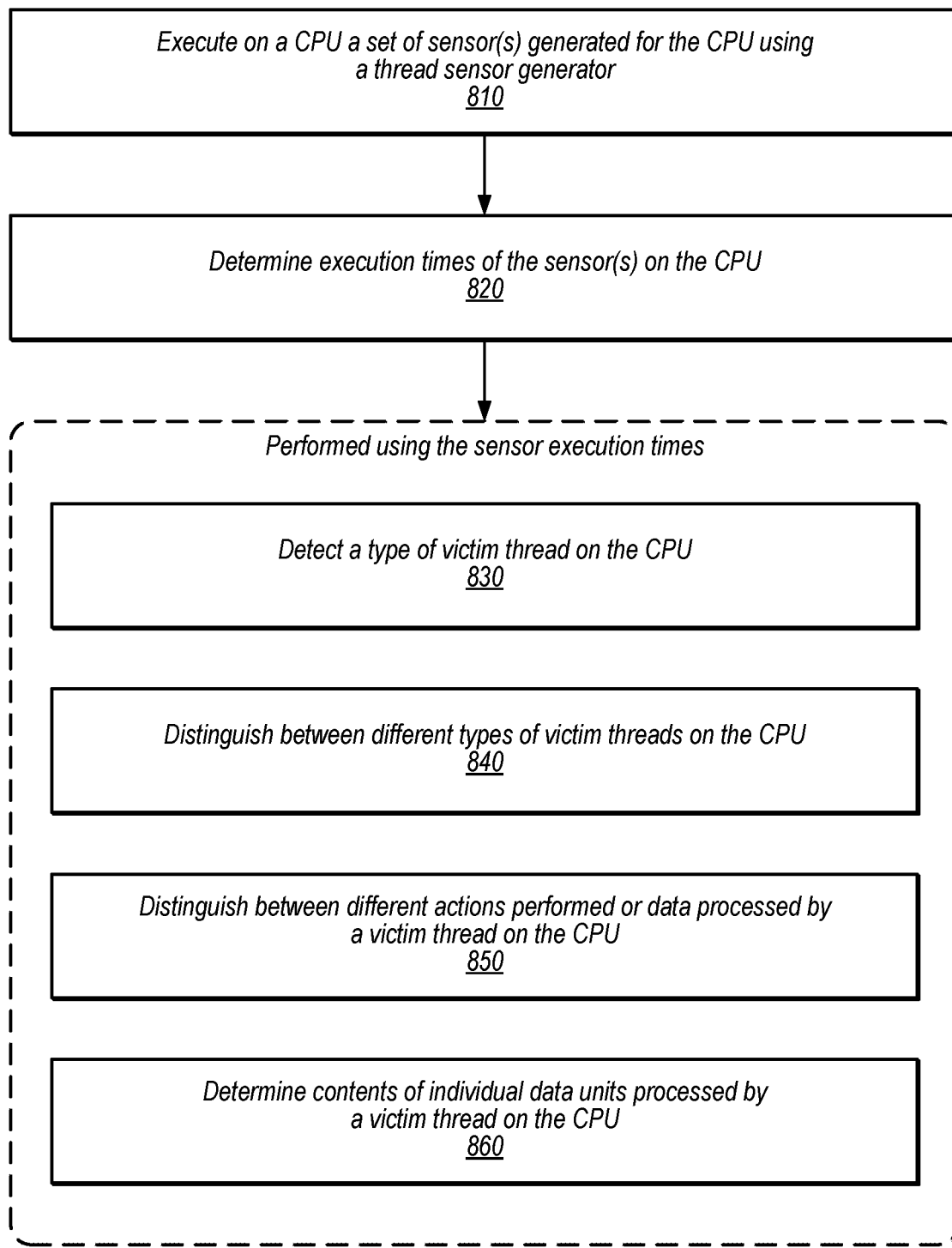
FIG. 8 is a flowchart illustrating a process of using a generated thread sensor to extract side channel information about victim threads on a multithreading CPU, according to some embodiments.

FIG. 8 is a flowchart illustrating a process of using a generated thread sensor to extract side channel information about victim threads on a multithreading CPU, according to some embodiments. The depicted process may be executed on a target machine with multithreading CPU such as the victim machine 520 of FIG. 5A or the virtual machine host 530 of FIG. 5B.

At operation 810, a set of sensor(s) is executed on the multithreading CPU. The set of sensor(s) may be generated by an embodiment of the thread sensor generation system 100 of FIG. 1. In some embodiments, the sensor(s) may have been deployed to the target machine from a remote attacker machine and over a network, as discussed in connection with FIG. 5A. In some embodiments, the sensor(s) may be executed on an attacker virtual machine that is hosted on the same virtual machine host as a victim virtual machine.

At operation 820, execution slowdowns of the sensors on the CPU are determined. For example, each sensor may log its execution time to a file, and the file may be analyzed by an analysis component. In some embodiments, the execution times may be programmatically provided to the analysis component via one or more API calls or network communications. In some embodiments, a sensor may provide a sample of measured execution times, and the analysis component may be configured to match the times to a previously determined detection profile, range, or threshold to determine whether there has been detection of a CPU condition (e.g. the presence of the victim thread).

As shown, operations 830, 840, 850, and 860 are performed using the sensor execution times determined in the previous operation. These operations may be performed by the analysis component discussed in connection with operation 820, which may be used to orchestrate the extraction of side channel information from the victim machine. Depending on the embodiment, only some of operations 830, 840, 850, and 860 may be performed.

At operation 830, the sensor execution times are used to detect the presence of a type of victim thread on the CPU, as discussed in connection with FIG. 6A. At operation 840, the sensor execution times are used to distinguish between different types of victim threads on the CPU, as discussed in connection with FIG. 6A. At operation 850, the sensor execution times are used to distinguish between different actions performed by a victim thread of different types of data processed by the victim thread, as discussed in connection with FIG. 6B. At operation 860, the sensor execution times are used to determine the contents of individual data units processed by the victim thread on the CPU, as discussed in connection with FIG. 6C. In some embodiments, the side channel information extraction process may proceed in stages, where a first set of sensors are tuned for the CPU, and then deployed so as to enable a second set of sensors to be tuned to extract more detailed information from the CPU. The entire process may be carried out over a long period of time, which may last days, weeks, or months.

Figure 9:
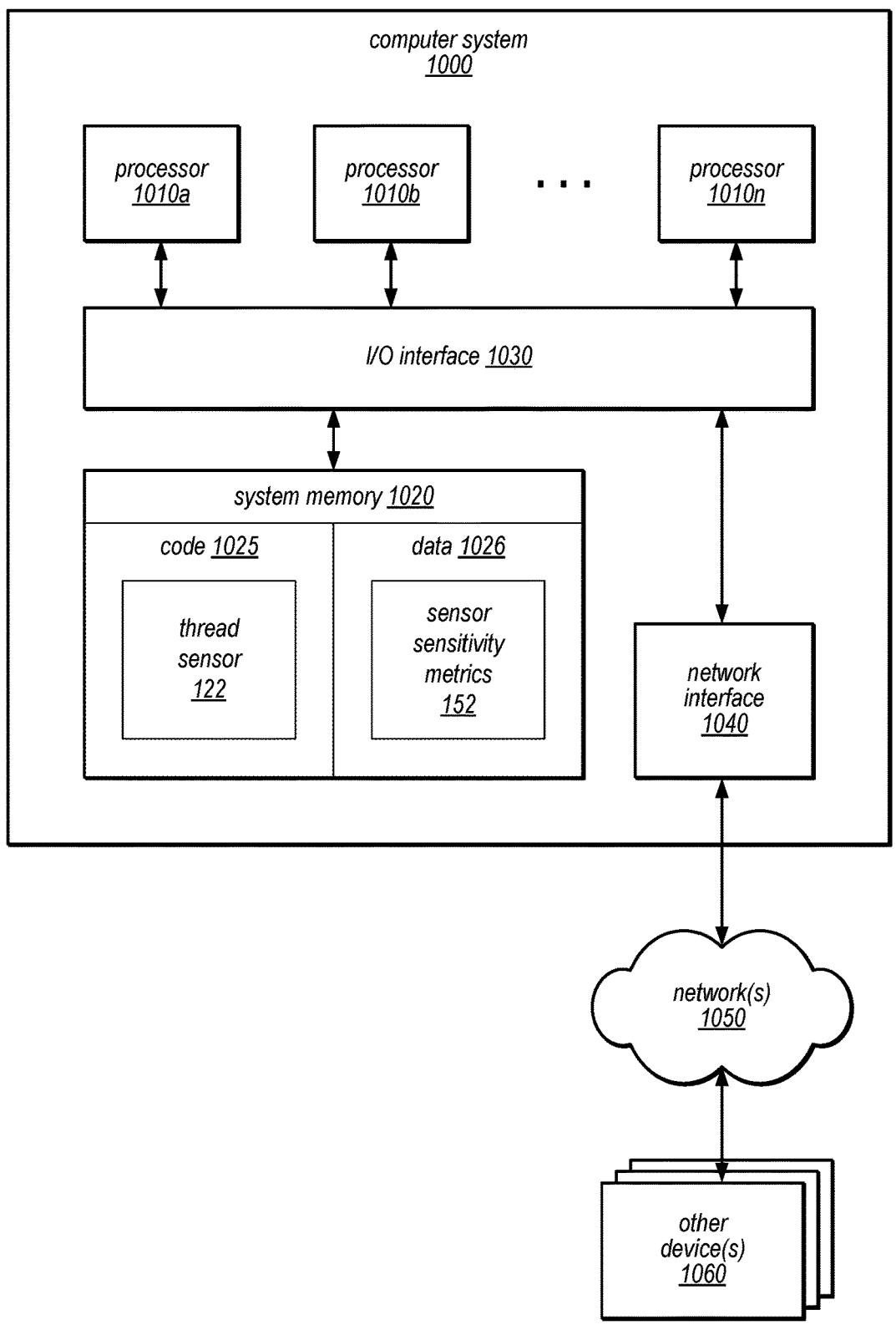
FIG. 9 is a block diagram illustrating an example computer system that can be used to implement one or more portions of a thread sensor generation system that generates and evaluates sensors for extracting side channel information about victim threads on a multithreading CPU, according to some embodiments.

FIG. 9 is a block diagram illustrating an example computer system that can be used to implement one or more portions of a thread sensor generation system that generates and evaluates sensors for extracting side channel information about victim threads on a multithreading CPU, according to some embodiments. For example, the computer system 1000 may implement the target machine with the multithreading CPU 140 that is used to execute the sensor threads generated by the thread sensor generation system 100.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device. As shown, computer system 1000 includes one or more processors 1010, which may be the multithreading processor 140 of FIG. 1. These processors 1010 may multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010a-n, as shown. In various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another application executing on another computer system, as described herein.

As shown, computer system 1000 may use its network interface 1040 to communicate with one or more other devices 1060, such as persistent storage devices and/or one or more I/O devices. In some embodiments, some of these other devices may be implemented locally on the computer system 1000, accessible via the I/O interface 1030. In various embodiments, persistent storage devices may include disk drives, tape drives, solid state memory, other mass storage devices, or any other persistent storage device. The computer system 1000 may store instructions and/or data in persistent storage devices, and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1020 may be used to store code 1025 or executable instructions to implement the methods and techniques described herein. For example, the executable instructions may store instructions that implement an instance of thread sensor 122, as discussed. The system memory 1020 may also be used to store data 1026 needed or produced by the executable instructions. For example, the in-memory data 1026 may be used to store the sensor sensitivity metrics 152 used to evaluate the sensors, as discussed.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1050. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:

1. A method comprising:
   performing, by a computer device that implements a thread sensor generator:
      creating a plurality of sensors for extracting side channel information from a central processing unit (CPU) that executes multiple threads in parallel;
      for each of the sensors:
         executing the sensor in a sensor thread on the CPU, in parallel with a victim thread,
         measuring an execution slowdown of the sensor thread caused by CPU resource conflicts between the sensor thread and the victim thread, and
         determining, based on the execution slowdown, a sensitivity metric of the sensor for the victim thread;
      selecting one of the sensors to use to extract side channel information from the CPU based on the sensitivity metrics of the sensors, wherein
         the selected sensor is selected based on a difference between the execution slowdown caused by the victim thread of a first type and a second execution slowdown caused by another victim thread of a second type; and
      distinguishing between the first and second types of victim threads on the CPU based on side channel information extracted from the CPU using the selected sensor.

2. The method of claim 1, wherein the creating of the sensors comprises:
   generating program code for a sensor that contains a random sequence of arithmetic or logic operations between variables or constants.

3. The method of claim 1, wherein the creating of the sensors comprises:
   generating a sensor that contains a sequence of instructions that is used by the victim thread.

4. The method of claim 1, wherein the creating of the sensors comprises:
   identifying a previously created sensor with a sensitivity metric that satisfies an acceptance criterion; and
   making random modifications to the previously created sensor to obtain the plurality of sensors.

5. The method of claim 1, wherein
   the measuring of the execution slowdown of the sensor thread is performed using a CPU cycle clock of the CPU.

6. The method of claim 1, wherein
   the computer device that implements the thread sensor generator is remote from another machine that implements the CPU, and
   the method further comprises performing, by the thread sensor generator:
      sending the plurality of sensors to the other computer device; and
      receiving the execution slowdowns of the sensors from the other computer device.

7. The method of claim 1, wherein the measuring of the execution slowdown of the sensor thread comprises:
   performing multiple executions of the sensor on the CPU to obtain multiple execution slowdown values; and
   determining an average of the multiple execution slowdown values.

8. The method of claim 1, wherein
   the measuring of the execution slowdown of the sensor thread comprises performing multiple executions of the sensor on the CPU to obtain a distribution of execution slowdown values, and
   the sensitivity metric is determined based on one or more parameters of the distribution of execution slowdown values.

9. The method of claim 1, further comprising:
   executing the selected sensor on the CPU; and
   determining, based on side channel information extracted from the CPU using the selected sensor, that another instance of the victim thread is executing on the CPU.

10. The method of claim 1, wherein
    the selected sensor is selected based on a difference between the execution slowdown caused by a first action of the victim thread and a second execution slowdown caused by a second action of the victim thread, and
    the method further comprises distinguishing between the first and second actions of victim threads on the CPU based on side channel information extracted from the CPU using the selected sensor.

11. The method of claim 1, wherein
    the victim thread is programmed to sequentially process data units of a piece of data, and
    the method further comprises determining contents of individual data units processed by an instance of the victim thread on the CPU based on side channel information extracted from the CPU using the selected sensor.

12. The method of claim 1, wherein
    the victim thread is programmed to encrypt data using a secret encryption key, and
    the method further comprises determining the encryption key based on side channel information extracted from the CPU using the selected sensor.

13. The method of claim 1, wherein
    the victim thread is programmed to process an image, and
    the method further comprises determining an approximation of the image based on side channel information extracted from the CPU using the selected sensor.

14. A system comprising:
    a computer device that implements a thread sensor generator, configured to:
       create a plurality of sensors for extracting side channel information from a central processing unit (CPU) that executes multiple threads in parallel;

for each of the sensors:
  execute the sensor in a sensor thread on the CPU, in parallel with a victim thread,
  measure an execution slowdown of the sensor thread caused by CPU resource conflicts between the sensor thread and the victim thread, and
  determine, based on the execution slowdown, a sensitivity metric of the sensor for the victim thread;
select one of the sensors to use to extract side channel information from the CPU based on the sensitivity metrics of the sensors, wherein
  the selected sensor is selected based on a difference between the execution slowdown caused by the victim thread of a first type and a second execution slowdown caused by another victim thread of a second type; and
distinguish between the first and second types of victim threads on the CPU based on side channel information extracted from the CPU using the selected sensor.

15. The system of claim 14, wherein
the CPU is a simultaneous multithreading CPU configured to execute instructions from different threads in a same execution pipeline stage.

16. The system of claim 14, wherein
the computer device that implements the thread sensor generator is remote from another computer device that implements the CPU, and
the thread sensor generator is configured to:
  send the plurality of sensors to the other computer device; and
  receive the execution slowdowns of the sensors from the other computer device.

17. The system of claim 16, wherein the thread sensor generator is configured to:
  send client-side code to a web browser executing on the other computer device, wherein the client-side code causes the sensors to be executed on the other computer device.

18. The system of claim 14, wherein to create the sensors, the thread sensor generator is configured to:
  identify a previously created sensor with a sensitivity metric that satisfies an acceptance criterion; and
  make random modifications to the previously created sensor to obtain the plurality of sensors.

19. A non-transitory computer-accessible storage medium storing program instructions that when executed on or across one or more processors implement a thread sensor generator and cause the thread sensor generator to:
  create a plurality of sensors for extracting side channel information from a central processing unit (CPU) that executes multiple threads in parallel;
  for each of the sensors:
    execute the sensor in a sensor thread on the CPU, in parallel with a victim thread,
    measure an execution slowdown of the sensor thread caused by CPU resource conflicts between the sensor thread and the victim thread, and
    determine, based on the execution slowdown, a sensitivity metric of the sensor for the victim thread;
  select one of the sensors to use to extract side channel information from the CPU based on the sensitivity metrics of the sensors, wherein
    the selected sensor is selected based on a difference between the execution slowdown caused by the victim thread of a first type and a second execution slowdown caused by another victim thread of a second type; and
  distinguish between the first and second types of victim threads on the CPU based on side channel information extracted from the CPU using the selected sensor.

* * * * *